United States Patent [19]

Altmann

[11] 4,413,344
[45] Nov. 1, 1983

[54] METHOD OF OPERATING A GASDYNAMIC $CO_2$-LASER

[75] Inventor: Konrad Altmann, Munich, Fed. Rep. of Germany

[73] Assignee: Messerschmitt-Boelkow-Blohm GmbH, Munich, Fed. Rep. of Germany

[21] Appl. No.: 268,762

[22] Filed: Jun. 1, 1981

[30] Foreign Application Priority Data

Jun. 11, 1980 [DE] Fed. Rep. of Germany ....... 3021858

[51] Int. Cl.³ .............................................. H01S 3/09
[52] U.S. Cl. .......................................... 372/90; 372/59; 372/58; 372/60; 372/89; 372/35
[58] Field of Search ..................... 372/58, 60, 35, 61, 372/90, 89, 55, 59; 239/555

[56] References Cited

U.S. PATENT DOCUMENTS 4,100,507 7/1978 Born et al. ............................ 372/35
4,283,686 8/1981 Daugherty et al. .................. 372/58

Primary Examiner—James W. Davie
Assistant Examiner—Leon Scott, Jr.
Attorney, Agent, or Firm—W. G. Fasse; D. H. Kane, Jr.

[57] ABSTRACT

A gasdynamic $CO_2$-laser in which the lasing medium is being cooled by expansion in a Laval nozzle, is operated in a way to amplify the cooling effect. This increased cooling is accomplished by introducing liquid droplets into the expanding lasing medium. These droplets are entrained by the flowing medium whereby the droplets are taken along with a speed corresponding approximately to the speed of the expanding lasing medium. The amplification of the cooling is accomplished by the evaporation of these droplets.

7 Claims, 1 Drawing Figure

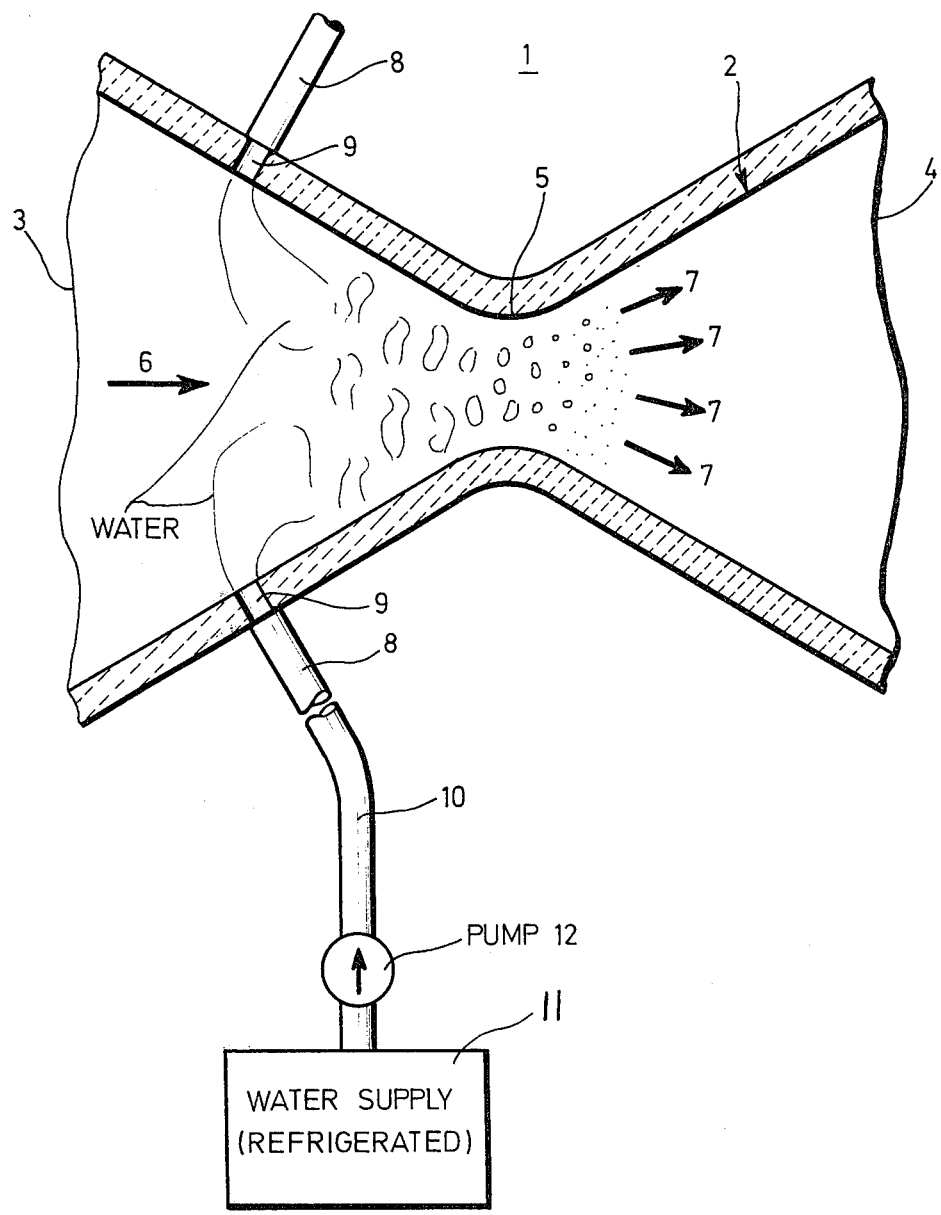

METHOD OF OPERATING A GASDYNAMIC CO₂-LASER

CROSS-REFERENCE TO RELATED APPLICATION

The present application is based on German Ser. No. P 3,021,858.7, filed on June 11, 1980 in the Federal Republic of Germany. Priority of the German Filing Date is claimed for the present application.

BACKGROUND OF THE INVENTION

The present invention relates to a method of operating a gasdynamic $CO_2$-laser. Such lasers have a Laval nozzle in which the lasing medium is cooled due to the expansion downstream of the Laval nozzle. Due to such cooling of the lasing medium by expansion with the aid of the Laval nozzle, the so-called translation temperature is lowered so quickly that the vibration or oscillation energy stored in the $N_2$-molecule is subject to a so-called "freeze up". In order to decouple or extract this energy in a resonator as radiation energy, it is necessary to reduce the translation temperature to at least room temperature. This reduction of the translation temperature is possible in a gasdynamic $CO_2$-laser having a Laval nozzle if the stagnation temperature is within the range of 1500° to 1800° K.

However, the energy available for decoupling relative to the mass throughput increases substantially and more than proportional with reference to a rising stagnation temperature. Therefore it is desirable to operate such lasers at the maximally possible stagnation temperature. This desirability of keeping the stagnation temperatures at a maximum, poses the problem of sufficiently lowering the translation temperature during the expansion process. For this purpose it is necessary to increase the surface area ratio F/F*, wherein F* is the cross-sectional surface area of the nozzle. However, at large surface area ratios the mach numbers are high and the Laval nozzle becomes ineffective. At large mach numbers the ratio of $T_1/T_2$ approaches a limit value as follows.

$$T_1/T_2 = (F_2/F_1)^{\gamma-1};$$

wherein $T_1$ and $T_2$ are translation temperatures at different cross-sectional nozzle areas and wherein $F_1$ and $F_2$ are these different nozzle cross-sectional areas at two different points along a flow channel, and wherein $\gamma$ is the adiabatic coefficient. This value or coefficient may be, for example, approximately 1.3 for $CO_2$-$N_2$-$H_2O$ lasers.

OBJECTS OF THE INVENTION

In view of the above it is the aim of the invention to achieve the following objects singly or in combination:

to operate a gasdynamic laser in such a manner that a trouble-free operation is assured at high stagnation temperatures without necessarily satisfying the expansion conditions or ratios that had to be satisfied heretofore; and to enable a sufficient cooling of the translation temperatures while simultaneously maintaining a maximum stagnation temperature.

SUMMARY OF THE INVENTION

According to the invention there is provided a gasdynamic $CO_2$-laser and method for operating such a laser in which the lasing medium is cooled by its expansion in the Laval nozzle. The invention is characterized in that simultaneously with the expansion or impending expansion a cooling liquid is introduced into the flowing lasing medium, whereby the liquid is dispersed into droplets which are entrained in the flowing lasing medium and attain substantially the same speed as the lasing flowing medium, whereby the latter is further cooled or its cooling is amplified by the vaporization of these liquid droplets.

According to the general teaching of the invention the principle of the Laval nozzle, namely, the temperature lowering by expansion at small mach numbers is maintained, whereas at greater mach numbers the required additional temperature reduction is achieved by a lowering of the actual stagnation temperature. In this context the term "actual stagnation temperature" is intended to mean that temperature which the lasing medium would reach if the lasing medium is subject to an isentropic braking action. In case of a Laval nozzle this so-called actual temperature is the temperature in the plenum. This lowering of the actual stagnation temperature is achieved according to the invention by the evaporation of microscopically small water droplets which are entrained in the flow of the lasing medium.

A theoretical estimate shows that the operational result should be the better the closer the speed of the droplets corresponds to the speed of the flow of the lasing medium. Stated differently, the flow of the lasing medium and that of the water droplets should have approximately the same speed. In that instance the relative change of the translation temperature could be expressed for large mach numbers M and for stagnation temperatures in the plenum within the range between 2500° and 3500° K. approximately as follows:

$$dT/T \approx -\{M^2(\gamma-1)/2+1\}dw/w.$$

In this relationship dT/T is the relative change of the translation temperature and dw/w is the relative change of the mass throughput of the gaseous component of the flow due to the evaporation of the water droplets. This relationship shows that the temperature reduction as a result of evaporation becomes more effective for larger mach numbers. Thus, the present teaching is an ideal supplement of the expansion principle as it is being used in Laval nozzles.

The water quantity required for the cooling according to the invention has been found to be typically within a range smaller than about 15 to 20 mol-percent.

BRIEF FIGURE DESCRIPTION

In order that the invention may be clearly understood, it will now be described, by way of example, with reference to the single figure of the accompanying drawing which shows a schematic sectional view through a Laval nozzle equipped for operation according to the invention.

DETAILED DESCRIPTION OF A PREFERRED EXAMPLE EMBODIMENT AND OF THE BEST MODE OF THE INVENTION

The single FIGURE shows a Laval nozzle 1 having a housing 2 including an upstream portion 3 and a downstream portion 4 separated by a nozzle neck 5. Arrows 6 indicate the flow of the lasing medium. Arrows 7 indicate the expanding and dispersing flow of atomized water droplets with the laser flow close to and downstream of the nozzle neck 5.

The cooling liquid such as water may be introduced into the nozzle 1 upstream of and close to the nozzle neck 5 through holes 9 connected to pipes 8. The holes 9 through which the liquid exits into the gas flow are minute to provide a five spray. The pipes 8 are connected through a conduit 10 to a water supply container 11 which is preferably refrigerated. The container 11 may be pressurized or a pump 12 may be inserted in the conduit 10. This pressurizing may be possible by using the pressure difference between the plenum and the gasflow at the injection points or holes 9.

According to the invention each pipe 8 may be provided with a plurality of minute holes 9, whereby these holes 9 in combination with the pump 12 operate as injectors near the nozzle neck 5 for injecting water in the form of very fine jets into the flow 6 of the lasing medium. Due to the high flow speed of the lasing medium flow 6 the injected water jets are rapidly dispersed and atomized and simultaneously accelerated to preferably assume substantially or nearly the same speed as the lasing flow 6. As shown in the drawing the size of the liquid drops gets smaller from left to right and is smallest downstream of the nozzle neck 5 near the arrows 7. By injecting the water as jets upstream of the nozzle neck 5 as shown, the resulting droplets are exposed to a strong acceleration by the flow 6 toward the nozzle neck 5. However, the pipes could also be placed downstream of the nozzle neck if desired so long as the flow speed assures the dispersion of the cooling liquid.

Since the transition time of the lasing flow 6 in the neck zone of the nozzles having a neck diameter of about 0.1 mm is typically within the range of less than one micro-second, the droplets are not evaporated upstream of the nozzle neck 5. Thus, the evaporation takes place only downstream of the nozzle neck. A boiling of the droplets and therefore a very rapid vaporization or evaporation is accomplished if the pressure of the lasing gas due to the expansion drops below the vapor pressure of the droplets which depends on the temperature of the droplets. Thus, the invention achieves an effective cooling of the medium, especially at high mach numbers.

In a modification of the invention the cooling liquid, such as water, is distributed as a fine mist in a supercooled or under cooled gas vapor mixture even prior to the injection through the pipes 8 and holes 9. For this purpose it is desirable to refrigerate the water supply container 11. The fine mist are also be introduced through suitable injectors into a zone adjacent to the nozzle neck 5 whereby the speed of the lasing flow 6 disperses the cooling mist even further. Suitable injectors for this purpose are disclosed in German Patent Publication No. P 3,008,425.4.

In addition to the effective cooling of the lasing medium even at high mach numbers the invention achieves yet a further advantage. Due to the lowering of the actual stagnation temperature the actual stagnation pressure increases substantially. This is of special importance to a laser system having an open circuit flow, because this fact greatly facilitates solving the problem of compressing the laser gas after it passes through the resonator. The compression must be accomplished down to atmospheric pressure and this may be accomplished by means of a diffuser.

The suggested use of water for the cooling medium is based on the fact that water has a very large evaporation heat corresponding to approximately 2500 joules/gram. Thus, even small quantities of water will provide an effective cooling. Additionally, in a $CO_2$-$N_2$-laser water is not a foreign matter because it is being used anyway as a catalyst for emptying the lower laser or lasing levels.

Although the invention has been described with reference to specific example embodiments, it will be appreciated, that it is intended, to cover all modifications and equivalents within the scope of the appended claims.

What is claimed is:

1. A method for operating a gas dynamic $CO_2$-laser having a Laval nozzle with a nozzle neck, comprising the steps of flowing a lasing medium through said Laval nozzle to produce a lasing medium flow (6), expanding said flowing lasing medium downstream of said nozzle neck for cooling the flowing lasing medium, introducing a cooling liquid into the lasing medium flow (6) near to said nozzle neck for entraining the liquid in the lasing medium flow flowing at high speed, dispersing said liquid by the high speed of the lasing medium flow to thereby form fine liquid droplets, and evaporating the liquid droplets in the flowing lasing medium for amplifying the cooling of the expanding lasing medium.

2. The method of claim 1, wherein said step of introducing a cooling liquid comprises water introducing into said high speed lasing medium flow for dispersing said water to form said droplets having a droplet size within the range of 1 to 20 micron.

3. The method of claim 1 or 2, wherein said step of introducing comprises injecting the liquid upstream of and near to said nozzle neck into the lasing medium flow (6), whereby acceleration of said lasing medium flow (6) is caused inherently in the nozzle neck and the resulting speed increase of said lasing medium flow achieves a further atomization of the cooling liquig down to the finest droplet sizes.

4. The method of claim 1, further comprising supplying said cooling liquid in the form of a fine mist of a cooled gas vapor mixture, and injecting said fine mist at a point upstream of and near to said nozzle neck into said lasing medium flow which is hot at this point.

5. The method of claim 4, further comprising accelerating said fine mist prior to its evaporation to a speed corresponding approximately to the speed of the lasing medium flow (6).

6. The method of claim 5, wherein said acceleration is accomplished by a respective geometry or shape of said Laval nozzle.

7. The method of claim 1, wherein said lasing medium flow (6) has a given flow speed and wherein said introduced cooling liquid is entrained into said lasing medium flow (6) to assume approximately the same speed as said given flow speed in about less than 1 microsecond.

* * * * *

UNITED STATES PATENT AND TRADEMARK OFFICE
CERTIFICATE OF CORRECTION

PATENT NO.- : 4,413,344
DATED     : November 1, 1983
INVENTOR(S) : Konard Altmann It is certified that error appears in the above-identified patent and that said Letters Patent is hereby corrected as shown below:

Column 4, line 33, claim 2, line 2, "water introducing"

should read -- introducing water --.

Column 4, line 43, claim 3, line 7, "liquig" should read

-- liquid --.

Signed and Sealed this

Third Day of January 1984

[SEAL]

Attest:

GERALD J. MOSSINGHOFF

Attesting Officer    Commissioner of Patents and Trademarks